US011035424B2

United States Patent
Fitz et al.

(10) Patent No.: US 11,035,424 B2
(45) Date of Patent: Jun. 15, 2021

(54) CONTROLLING AN ACTUATOR FOR A CLUTCH (71) Applicant: GKN Automotive Ltd., Birmingham (GB)

(72) Inventors: Rudolf Fitz, Troisdorf (DE); Eric Esch, Euskirchen (DE)

(73) Assignee: GKN Automotive Ltd., Birmingham (GB)

( * ) Notice: Subject to any disclaimer, the term of this patent is extended or adjusted under 35 U.S.C. 154(b) by 0 days.

(21) Appl. No.: 16/761,868

(22) PCT Filed: Nov. 21, 2017

(86) PCT No.: PCT/EP2017/079947
§ 371 (c)(1),
(2) Date: May 6, 2020

(87) PCT Pub. No.: WO2019/101298
PCT Pub. Date: May 31, 2019

(65) Prior Publication Data
US 2020/0263744 A1   Aug. 20, 2020

(51) Int. Cl.
*F16D 28/00* (2006.01)
*F16D 48/08* (2006.01)
*F16D 23/12* (2006.01)

(52) U.S. Cl.
CPC ............. *F16D 48/08* (2013.01); *F16D 23/12* (2013.01); *F16D 28/00* (2013.01);
(Continued)

(58) Field of Classification Search
CPC .......... F16D 48/08; F16D 23/12; F16D 28/00; F16D 2023/123; F16D 2500/1023;
(Continued)

(56) References Cited

U.S. PATENT DOCUMENTS

| 2007/0144861 A1* | 6/2007 | Yamasaki | ............... F16D 28/00 192/70.23 |
| 2010/0000835 A1* | 1/2010 | Connolly | ............... F16D 28/00 192/31 |

(Continued)

FOREIGN PATENT DOCUMENTS

| DE | 10065355 C2 | 11/2002 |
| DE | 102005061268 A1 | 6/2007 |

(Continued)

OTHER PUBLICATIONS

International Search Report and Written Opinion for PCT/EP2017/079947 dated Sep. 4, 2018 (11 pages; with English translation).

*Primary Examiner* — David J Hlavka
(74) *Attorney, Agent, or Firm* — Bejin Bieneman PLC (57) ABSTRACT

The disclosure relates to a method for controlling an actuator or an actuator device, at least comprising a clutch and an actuator, which actuator has: an electric drive motor and a control device; a ramp mechanism, which comprises a rotatable first disk, which has first ramps, a second disk, which can be moved only in an axial direction and which has second ramps, and balls, which are arranged between the disks in the first ramps and second ramps; and at least one spring for moving the second disk in the axial direction. The dynamics of the electric drive motor are reduced by the control device at least in dependence on at least the determined preloading force or the first play in such a way that, during braking, the pin contacts only one side surface or that, in the event of a reversal of the rotational motion, the pin bridges the first play at a reduced first rotational speed of the drive motor and comes into contact with the other side surface and only then does an increase to a second rotational speed occur.

20 Claims, 3 Drawing Sheets

(52) U.S. Cl.
CPC .............. *F16D 2023/123* (2013.01); *F16D 2500/1023* (2013.01); *F16D 2500/30401* (2013.01); *F16D 2500/501* (2013.01); *F16D 2500/5122* (2013.01)

(58) Field of Classification Search
CPC ..... F16D 2500/30401; F16D 2500/501; F16D 2500/5122; F16D 2125/36; F16D 2300/22; F16H 2048/343
See application file for complete search history.

(56) References Cited

U.S. PATENT DOCUMENTS

| | | | | |
|---|---|---|---|---|
| 2011/0100780 | A1* | 5/2011 | Jurjanz | F16D 23/12 192/93 A |
| 2018/0106301 | A1* | 4/2018 | Moubarak | F16D 21/06 |

FOREIGN PATENT DOCUMENTS

| | | | |
|---|---|---|---|
| EP | 0863330 | A1 | 9/1998 |
| EP | 3101297 | A1 | 12/2016 |

* cited by examiner

CONTROLLING AN ACTUATOR FOR A CLUTCH

CROSS-REFERENCE TO RELATED APPLICATIONS

This application is a national stage of, and claims priority to, Patent Cooperation Treaty Application No. PCT/EP2017/079947, filed on Nov. 21, 2017, which application is hereby incorporated herein by reference in its entirety.

BACKGROUND

The construction of a clutch and an actuator is disclosed, for example, in DE 100 65 355 C2. In this case the focus is on producing a rapid return motion for the actuator with damped stopping behavior. To this end, the electric motor is operated in a flexible manner so that, shortly before a starting position is reached, for generating a braking moment the electric motor is either short-circuited or a positive voltage is applied to the electric motor. Thus it is intended that the balls striking against the groove ends of the setting rings are damped and a hard impact which is thus generated is prevented.

The comfort of a motor vehicle is intended to be continuously improved. For example, for an occupant of the motor vehicle all audible noises and perceptible operating forces from the drive train are intended to be reduced or prevented as far as possible during operation of the motor vehicle.

SUMMARY

The present disclosure relates to a method for controlling an actuator for a clutch, for example for a multiplate clutch, e.g., for a clutch which is arranged on a side shaft of a motor vehicle, so that by closing the clutch the entire axle (in this case the actuated clutch is denoted as the booster) or just one wheel (in this case the actuated clutch is denoted as the twinster) of the motor vehicle is connected to a drive unit of the motor vehicle so as to transmit torque. The actuator is an electromechanical actuator.

The actuator comprises an electric drive motor and a control apparatus, a ramp mechanism with a rotatable first disk (setting ring), which has first ramps (grooves), a second disk (setting ring) which can be moved only in an axial direction, which has second ramps (grooves), and balls which are arranged between the disks in the first ramps and second ramps and at least one spring for moving the second disk in the axial direction.

Proceeding therefrom, the disclosure is directed to solving at least partially the problems set forth in connection with the prior art. For example, a method for controlling an actuator for a clutch is intended to be proposed, a further reduction in the audible noises or perceptible operating forces being permitted thereby.

A method according to the features of claim 1 contributes thereto. Advantageous developments form the subject matter of the dependent claims. The features set forth individually in the claims are able to be combined together in a manner which is technologically expedient and may be complemented by explanatory technical content from the description and details from the figures, wherein further variants of the disclosure are disclosed.

A method for controlling an actuator of an actuator device is proposed, wherein the actuator device at least comprises a clutch and an actuator. The actuator comprises at least an electric drive motor and a control device, a ramp mechanism which comprises a rotatable first disk, which has first ramps, a second disk, which can be moved only in an axial direction and which has second ramps, and balls, which are arranged between the disks in the first ramps and second ramps, at least one spring for moving the second disk in the axial direction.

The first disk is rotatable via the drive motor and by means of the ramp mechanism the second disk is movable thereby in a first axial direction for actuating the clutch. The second disk is movable by means of the at least one spring in a second axial direction and the first disk is rotatable thereby.

The second disk is secured via a pin which cooperates with a groove on the second disk relative to a rotation in a circumferential direction. The pin is supported at least according to a rotational direction of the first disk on a first side surface facing in a first circumferential direction or on a second side surface of the groove facing in a second circumferential direction.

In the event of an imminent braking of a rotational motion of the drive motor or a reversal of the rotational motion of the drive motor, the method comprises at least the following steps:

a) a currently present rotational direction of the first disk is established and the side surface on which the pin is supported during the rotation of the first disk is determined; and at least one of:

b) a preloading force of the at least one spring is determined according to a position of the second disk in the axial direction; and c) a first play is determined between the pin and the first side surface as well as the second side surface; and then:

d) the dynamics of the electric drive motor are reduced by the control device at least in dependence on at least the determined preloading force or the first play in such a way that, during braking, the pin contacts only the side surface established in step a) or that, in the event of a reversal of the rotational motion, the pin bridges the first play at a reduced first rotational speed of the drive motor and comes into contact with the other side surface and only then does an increase to a second rotational speed occur.

The first disk is connected fixedly in terms of rotation to a drive shaft of the drive motor. One or more speed-transforming gears (for example gearwheel pairs) may be provided between the first disk and the drive motor.

The first disk and the second disk are arranged, for example, coaxially to one another, wherein the first disk is rotatable via the drive motor and the second disk is movable via the ramp mechanism in the first axial direction (i.e. away from the first disk). Moreover, a spring is provided, for example between the second disk and the clutch, the second disk being able to be moved back in the second axial direction thereby (i.e. toward the first disk). The spring may be designed, for example, as one or a plurality of spiral springs which extend in the circumferential direction. The spring may be designed as an axial spring which is able to push back the second disk in the second axial direction in the case of a ramp mechanism without self-inhibition.

The disks have in each case, for example, a plurality of ramps (grooves) which extend in a circumferential direction, wherein for example a ball which is displaceable along the ramps is arranged in each ramp pair (a first ramp and a second ramp). The rotation of the first disk and/or the restoring force acting on the second disk leads to a movement of the balls in the circumferential direction in the respective ramp pair so that a spacing between the first disk and the second disk is altered.

Via the movement of the second disk in the axial direction the clutch may be actuated (engaged or disengaged).

The second disk is fixed and/or secured via a pin relative to a rotation in the circumferential direction. For example, the pin extends in a radial direction from the outside to the inside into a groove on the second disk.

A first play (i.e. a difference between a diameter of the pin and a spacing from the first side surface to the second side surface) is provided between the groove and pin which, for example, is between 0.05 millimeters and 1.0 millimeter, for example at most 0.5 millimeters.

As a result of the high acceleration of the drive motor and the achievable high rotational speeds, during the operation of (conventional) actuator devices the striking of the pin on the respective side surface may result in a knocking noise. Moreover, for example during the braking of the drive motor starting from high rotational speeds, an undershooting and/or overshooting may occur and thus a reversal of the acceleration forces so that, for example, in the slightly spring-preloaded region (for example, with a progressive spring characteristic curve of the spring used) vibrations are induced and thus noises may be produced between the pin and second disk.

For example, with an increasing movement of the second disk in the first axial direction the spring is increasingly tensioned, wherein the slightly spring-preloaded region is present when the second disk is arranged so that it is moved as far as possible in the second axial direction (the clutch is disengaged and/or opened).

In order to prevent these noises, for example, that the dynamics (rotational speed, acceleration and/or braking) of the electric drive motor are reduced by the control device at least in dependence on at least the determined preloading force or the first play in such a way that, during braking of the drive motor, the pin contacts only the side surface established in step a) or that, in the event of a reversal of the rotational motion, the pin bridges the first play at a reduced first rotational speed of the drive motor and comes into contact with the other side surface and only then does an increase to a second rotational speed occur.

For example, with an end stop detection the actuator is moved into a mechanical end stop (for example when the ball strikes against the end of at least one of the ramps), wherein the method controls the acceleration (and/or the braking) and the rotational speed such that the pin does not strike against the other side surface.

The end stop detection may be initiated when the operation of the actuator is started. When the operation of the actuator is started, the clutch, for example, is disengaged (opened) and initially moved into the end stop for determining a defined position of the actuator.

As soon as the end stop is detected and the defined position of the actuator has been determined, the clutch may be engaged (closed) until the kiss point is reached. The "kiss point", in particular, is the operating point of a clutch at which a torque may be transmitted by the clutch.

Due to the previous end stop detection, the pin is still in contact with the one side surface. As soon as the rotational direction of the drive motor is reversed, the pin (also according to the preloading of the spring) bridges the first play and comes into contact with the other side surface. This circumstance is taken into account by the method and the rotational motion of the drive motor is implemented at a reduced first rotational speed and/or reduced acceleration.

Only after coming into contact with the other side surface does the increase to the second rotational speed and/or to a greater acceleration of the drive motor occur.

This start-up with reduced dynamics may also be implemented when the clutch is arranged at the time of a torque requirement in a region around the kiss point. Since here, for example, a slight spring preloading is present, the position of the pin relative to the side surfaces may be undetermined. The start-up of the drive motor with reduced dynamics also permits the pin to come into contact with the relevant side surface, wherein the generation of noises is prevented.

The method is also able to be used when disengaging (opening) the clutch. For example, the hitherto present high accelerations (braking) lead to undershooting. As a result of the sharp braking, a reversal of the acceleration forces is achieved so that, for example, in the slightly spring-preloaded region vibrations are induced and noises generated between the pin and side surfaces. Moreover, the spring is not able to follow the dynamics of the drive motor so that the spring briefly lifts away and strikes against the second disk or the clutch and generates additional noises.

The method permits a braking of the drive motor and thus of the actuator without undershooting and force reversal. In this case, the time required for the intended torque reduction, however, is in particular not affected by the method described here (i.e. extended).

In step c) a second play of at least one speed-transforming gear between the drive motor and the first disk may be additionally taken into account. The second play comprises, for example, the play of the gearwheel pairs which form the at least one speed-transforming gear. For example, braking or acceleration and/or start-up are possible even with reduced dynamics of the drive motor, so that a reliable bearing of the surfaces in contact with one another is ensured (when the actuator device is operated in one rotational direction).

For example, the method is carried out when the actuator is moved into a mechanical end stop. The mechanical end stop, for example, is reached when the ball(s) is moved (strikes) against the end of at least one of the ramps, wherein the method controls the acceleration (and/or the braking) and the rotational speed such that the pin does not strike against the other side surface.

The method may be carried out, for example, when the actuator is moved out of a mechanical end stop into a first position which corresponds to a torque requirement of the clutch. The first position may be, for example, the kiss point of the clutch or a first position in which a defined torque is able to be transmitted via the clutch.

The method may be carried out when the clutch is closed (engaged), wherein during step d) the first rotational speed is constant.

For example, when closing the clutch, until reaching and optionally passing through a transmission region of the clutch in which between 5 and 15 newton meters, for example between 7 and 12 newton meters, are able to be transmitted, the drive motor is operated at an (optionally variable) first rotational speed, wherein the drive motor is only subsequently accelerated to a second rotational speed.

For example, the first rotational speed is constant in a transmission region of the clutch in which between 5 and 15 newton meters, for example between 7 and 12 newton meters, are able to be transmitted.

If the clutch continues to be engaged over this transmission region (for greater transmissible torques) the drive motor, for example, is accelerated to a second rotational speed.

For example, the second rotational speed is greater than the first rotational speed by a factor of at least two, e.g., three.

The method is able to be deselected according to an amount of torque which is required in the event of a torque requirement.

For example, the amount of required torque is at least 50 newton meters, e.g., at least 100 newton meters.

When the method is deselected the drive motor is accelerated immediately to the second rotational speed so that in these situations the greatest possible dynamics, which produce an acceleration jolt, may be utilized.

The method may be carried out when the clutch is opened. For example, the high accelerations (braking) hitherto used in actuator devices lead to undershooting. As a result of the sharp braking action a reversal of the acceleration forces is achieved so that, for example, in the slightly spring-preloaded region vibrations are induced and noises generated between the pin and the side surfaces. Furthermore, the spring is not able to follow the dynamics of the drive motor so that the spring briefly lifts away and strikes against the second disk or the clutch and generates additional noises.

The clutch may be opened at a third rotational speed of the drive motor, wherein immediately before reaching a kiss point of the clutch the drive motor has a fourth rotational speed which is reduced relative to the third rotational speed.

The third rotational speed is, for example, greater than the fourth rotational speed by a factor of two, for example of three.

For example, during the braking of the electric drive motor a third rotational speed of the first disk decreases exponentially.

For example, the exponential decrease in the third rotational speed takes place in a transmission region of the clutch, in which between 5 and 15 newton meters, for example between 7 and 12 newton meters, are able to be transmitted.

A motor vehicle is further proposed at least comprising a drive unit (an internal combustion engine or an electric drive unit, in each case for driving the motor vehicle), a clutch and an actuator for the clutch. The actuator comprises an electric drive motor and a control device, a ramp mechanism which comprises a rotatable first disk, which has first ramps, a second disk which can be moved only in an axial direction and which has second ramps, and balls which are arranged between the disks in the first ramps and second ramps, and at least one spring for moving the second disk in the axial direction. The control device is suitable for carrying out the method described herein and/or may carry out the method described herein during the operation of the motor vehicle.

For the avoidance of doubt, the quantifiers used herein ("first", "second", etc.) primarily (only) serve for differentiating between several similar objects, values or processes, i.e. in particular do not necessarily predetermine any dependency and/or sequence of these objects, values or processes relative to one another. Should a dependency and/or sequence be required, this is explicitly specified herein or it becomes obvious to the person skilled in the art by studying the embodiment actually described.

The disclosure and the technical background are described in more detail hereinafter with reference to the figures. It should be mentioned that the disclosure is not intended to be limited by the exemplary embodiments shown. In particular, unless explicitly indicated otherwise, it is also possible to extract partial features of the technical content described in the figures and to combine them with other components and knowledge from the present description and/or figures. The same reference numerals denote the same objects, so that optionally descriptions from other figures may be used as a supplement.

DETAILED DESCRIPTION

Figure 1:
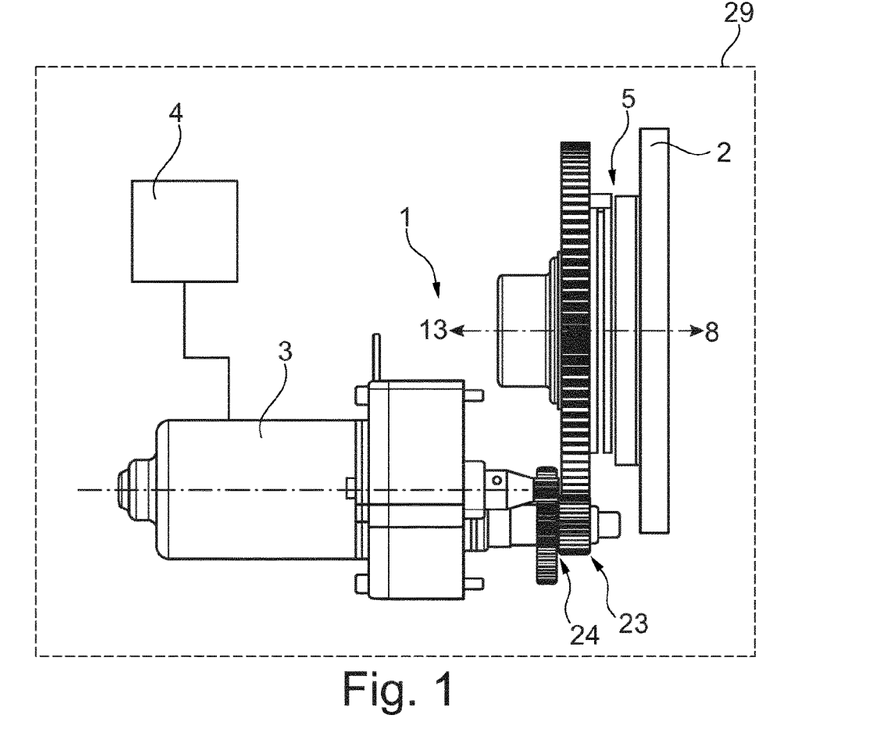
FIG. 1 shows a motor vehicle with an actuator and a part of a clutch in a side view and with a control device.
Figure 2:
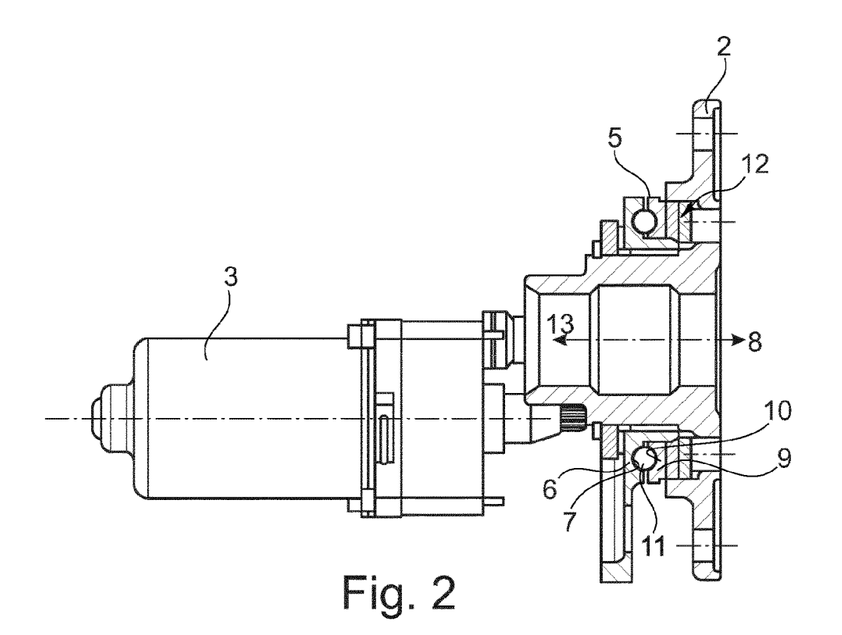
FIG. 2 shows the actuator and the part of the clutch in a further side view, partially in section.

FIG. 1 shows a motor vehicle 29 with an actuator 1 and a part of a clutch 2 in a side view and with a control device 4. FIG. 2 shows the actuator 1 and the part of the clutch 2 in a further side view, partially in section. FIGS. 1 and 2 are described together hereinafter.

The construction which is shown here of a clutch 2 and an actuator 1 is disclosed, for example, in DE 100 65 355 C2.

The actuator 1 comprises an electric drive motor 3 and a control device 4, a ramp mechanism 5 with a rotatable first disk 6, which has the first ramps 7, a second disk 9 which can be moved only in an axial direction 8, 13 and which has second ramps 10, and balls 11 which are arranged between the disks 6, 9 in the first ramps 7 and second ramps 10 and a spring 12 for moving the second disk 9 in the axial direction 8, 13.

The first disk 6 is rotatable via the drive motor 3 and by the ramp mechanism 5 the second disk 9 is movable thereby in a first axial direction 8 for actuating the clutch 2. The second disk 9 is movable by the spring 12 in a second axial direction 13 and the first disk 6 is rotatable thereby.

The first disk 6 is connected fixedly in terms of rotation to a drive shaft of the drive motor 3. Two speed-transforming gears (two gearwheel pairs) are provided between the first disk 6 and the drive motor 3. The first disk 6 and the second disk 9 are arranged coaxially to one another, wherein the first disk 6 is rotatable via the drive motor 3 and the second disk 9 is movable via the ramp mechanism 5 in the first axial direction 8 (i.e. away from the first disk 6). Moreover, a spring 12 is provided between the second disk 9 and the clutch 2, the second disk 9 being able to be moved back in the second axial direction 13 thereby (i.e. toward the first disk 6).

The disks 6, 9 have in each case a plurality of ramps 7, 10 (grooves) which extend in a circumferential direction 15, 17, wherein a ball 11 which can be moved along the ramps 7, 10 is arranged in each ramp pair (a first ramp 7 and a second ramp 10). The rotation of the first disk 6 and/or the restoring force acting on the second disk 9 leads to a movement of the balls 11 in the circumferential direction 15, 17 in the respective ramp pair so that a spacing between the first disk 6 and second disk 9 is altered. Via the movement of the second disk 9 in the axial direction 8, 13, the clutch 2 may be actuated (engaged or disengaged).

Figure 3:
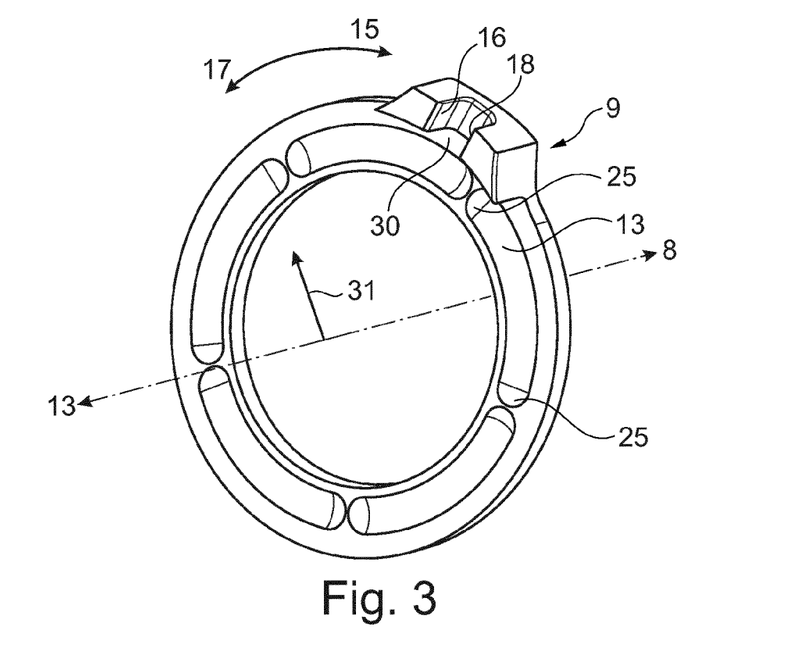
FIG. 3 shows a second disk of the actuator in a perspective view.
Figure 4:
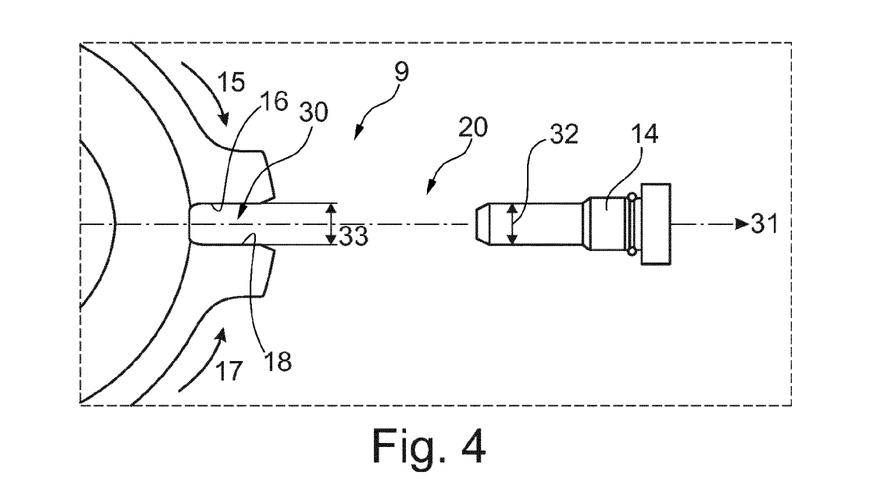
FIG. 4 shows a part of the second disk according to FIG. 3 in a view in the axial direction together with the pin in an exploded view.

FIG. 3 shows a second disk 9 of the actuator 1 in a perspective view. FIG. 4 shows a part of the second disk 9 according to FIG. 3 in a view in the axial direction 8 together with the pin 14 in an exploded view. FIGS. 3 and 4 are described together hereinafter. Reference is made to the embodiments of FIGS. 1 and 2. Reference is also made to FIGS. 1 and 2 hereinafter.

The second disk 9 is secured against a rotation in both circumferential directions 15, 17 via a pin 14 which cooperates with a groove 30 on the second disk 9. The pin 14 is supported at least according to a rotational direction of the first disk 6 on a first side surface 16 which faces in a first circumferential direction 15, or on a second side surface 18 of the groove 30 which faces in a second circumferential direction 17. The pin 14 extends in a radial direction 31 from the outside to the inside into the groove 30 on the second disk 9.

A first play 20 (i.e. a difference between a diameter 32 of the pin 14 and a spacing 33 from the first side surface 16 to the second side surface 18) is provided between the groove 30 and the pin 14.

In the event of an imminent braking of a rotational motion of the drive motor 3 or a reversal of the rotational motion of the drive motor 3 the method comprises at least the steps a) to d). In step a) a currently present rotational direction of the first disk 6 is established and the side surface 16, 18 on which the pin 14 is supported during the rotation of the first disk 6 is determined. According to step b) a preloading force of the spring 12 is determined according to a position 19 of the second disk 9 in the axial direction 8, 13. According to step c) a first play 20 is determined between the pin 14 and the first side surface 16 and the second side surface 18. In step c) a second play 23 of the speed-transforming gear 24 between the drive motor 3 and the first disk 6 may be additionally taken into account. The second play 23 comprises the play of the gearwheel pairs which form the speed-transforming gear 24. In this case, braking or accelerating and/or start-up are possible even with reduced dynamics of the drive motor 3, so that a reliable bearing of the surfaces in contact with one another is ensured (when the actuator device is operated in one rotational direction). According to step d) the dynamics of the electric drive motor 3 are reduced by the control device 4 at least in dependence on at least the determined preloading force or the first play 20 in such a way that, during braking, the pin 14 contacts only the side surface 16, 18 established in step a) or that, in the event of a reversal of the rotational motion, the pin 14 bridges the first play 20 at a reduced first rotational speed 21 (see FIG. 5) of the drive motor 3 and comes into contact with the other side surface 16 and only then does an increase to a second rotational speed 22 occur.

As a result of the high acceleration of the drive motor 3 and the achievable high rotational speeds 21, 22, 27, 28, during the operation of the actuator devices it may result in that the pin 14 striking against the respective side surface 16, 18 causes a knocking noise. Moreover, for example, during the braking of the drive motor 3 starting from high rotational speeds 21, 22, 27, 28, an undershooting and/or overshooting and thus a reversal of the acceleration forces may occur so that, for example, in the slightly spring-preloaded region (for example with a progressive spring characteristic curve of the spring 12 used) vibrations are induced and thus noises are generated between the pin 14 and the second disk 9. With an increasing movement of the second disk 9 in the first axial direction 8 the spring 12 is increasingly tensioned, wherein the slightly spring-preloaded region is present when the second disk 9 is arranged so that it is moved as far as possible in the second axial direction 13 (clutch 2 disengaged and/or opened).

In order to prevent these noises it is proposed to reduce the dynamics (rotational speed, acceleration and/or braking) of the electric drive motor 3 by the control device 4 at least in dependence on at least the determined preloading force or the first play 20.

In the case of an end stop detection the actuator 1 is moved into a mechanical end stop 25 (for example when the ball 11 strikes against the end of at least one of the ramps 7, 10), wherein the method controls the acceleration (and/or the braking) and the rotational speed 21, 22, 27, 28 such that the pin 14 does not strike against the other side surface 16, 18.

The end stop detection may be initiated when the operation of the actuator 1 is started. When the operation of the actuator 1 is started, the clutch 2, for example, is disengaged (opened) and for determining a defined position 19 of the actuator 1 initially moved into the end stop 25.

As soon as the end stop 25 is detected and the defined position 19 of the actuator 1 has been determined, the clutch 2 may be moved, for example, until a first position 19 is reached.

Figure 5:
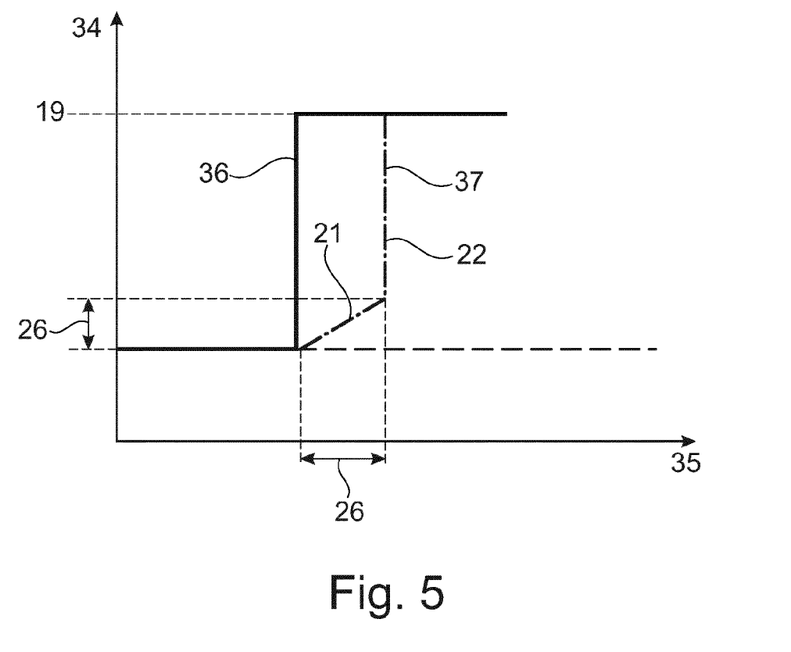
FIG. 5 shows a first variant of the method.

FIG. 5 shows a first variant of the method. In the diagram a rotational motion of the drive motor 3 is plotted on the vertical axis in angular steps 34 (for example in each case 2, 4, 6 or 8 angular degrees). The time 35 is plotted on the horizontal axis. The first curve 36 shows the known operating mode of the actuator 1. The second curve 37 shows the operation of the actuator according to the method.

Due to the previous end stop detection 25 the pin 14 is still in contact with the one side surface 16, 18. As soon as the rotational direction of the drive motor 3 is reversed, the pin 14 (also according to the preloading of the spring 12) bridges the first play 20 and comes into contact with the other side surface 18, 16. By means of the method this circumstance is taken into account and the rotational motion of the drive motor 3 is implemented at a reduced first rotational speed 21 and/or reduced acceleration. Only after contact with the other side surface 16, 18 does the increase to the second rotational speed 22 and/or to a higher acceleration of the drive motor 3 occur.

The method is carried out here with a closing (engagement) of the clutch 2, wherein during step d) the first rotational speed 21 is constant. In this case when closing the clutch 2, until reaching and passing through a transmission region 26 of the clutch 2, the drive motor 3 is operated at a constant first rotational speed 21, wherein the drive motor 3 is only subsequently accelerated to a second rotational speed 22.

This start-up with reduced dynamics may even be implemented when at the time of a torque requirement the clutch 2 is arranged in a region around the kiss point. Since here, for example, a slight spring preloading is present, the position of the pin 14 may be undefined relative to the side surfaces 16, 18. The start-up of the drive motor 3 with reduced dynamics also permits the pin 14 to come into contact with the relevant side surface 16, 18, wherein the generation of noises is prevented.

Figure 6:
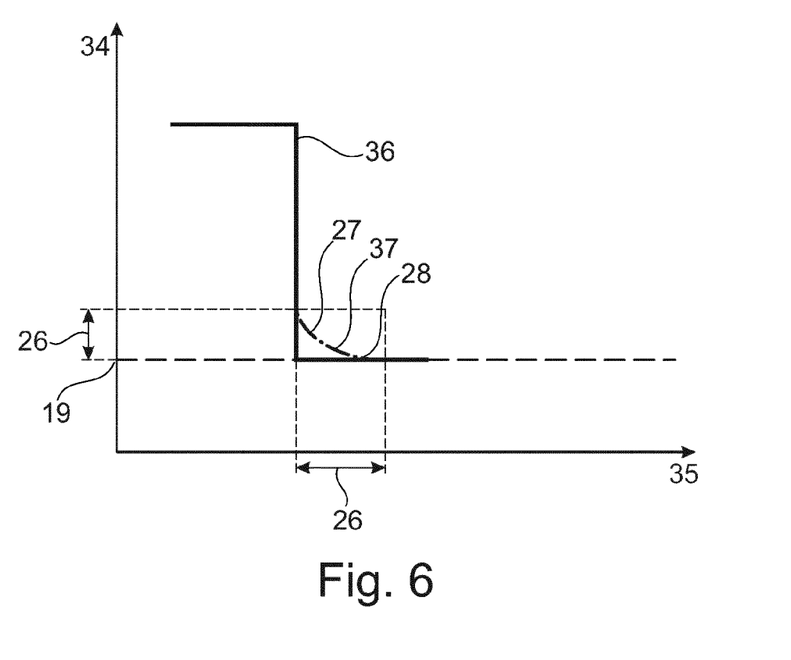
FIG. 6 shows a second variant of the method.

FIG. 6 shows a second variant of the method. In the diagram a rotational motion of the drive motor 3 is plotted on the vertical axis in angular steps 34 (for example in each case 2, 4, 6 or 8, etc. angular degrees). The time 35 is plotted on the horizontal axis. The first curve 36 shows the known operating mode of the actuator 1. The second curve 37 shows the operation of the actuator according to the method.

The method is shown when disengaging (opening) the clutch 2. The method permits a braking of the drive motor 3 and thus of the actuator 1 without undershooting and force reversal. The clutch 2 is opened at a third rotational speed 27 of the drive motor, wherein directly before reaching a kiss point (here the first position 19) of the clutch 2 the drive motor 3 has a fourth rotational speed 28 which is reduced relative to the third rotational speed 27. During the braking of the electric drive motor 3 a third rotational speed 27 of the first disk 6 exponentially decreases. The exponential decrease of the third rotational speed 27 takes place in a transmission region 26 of the clutch 2.

LIST OF REFERENCE NUMERALS

1 Actuator
2 Clutch
3 Drive motor
4 Control apparatus
5 Ramp mechanism
6 First disk
7 First ramp
8 First axial direction
9 Second disk
10 Second ramp
11 Balls
12 Spring
13 Second axial direction
14 Pin
15 First circumferential direction
16 First side surface
17 Second circumferential direction
18 Second side surface
19 Position
20 First play
21 First rotational speed
22 Second rotational speed
23 Second play
24 Speed-transforming gear
25 End stop
26 Transmission region
27 Third rotational speed
28 Fourth rotational speed
29 Motor vehicle
30 Groove
31 Radial direction
32 Diameter
33 Spacing
34 Angular step
35 Time
36 First curve
37 Second curve

The invention claimed is:

1. A method for controlling an actuator of an actuator device, the actuator device comprising a clutch and an actuator with:
an electric drive motor and a control device;
a ramp mechanism including a rotatable first disk, which has first ramps, a second disk, which can be moved only in an axial direction and which has second ramps, and balls, which are arranged between the disks in the first ramps and second ramps; and
at least one spring for moving the second disk in the axial direction;
wherein the first disk is rotatable via the drive motor, and by means of the ramp mechanism the second disk is movable thereby in a first axial direction for actuating the clutch, and the second disk is movable by the at least one spring in a second axial direction and the first disk is rotatable thereby;
wherein the second disk is secured via a pin which cooperates with a groove on the second disk relative to a rotation in a circumferential direction;
wherein the pin is supported at least according to a rotational direction of the first disk on a first side surface facing in a first circumferential direction or on a second side surface of the groove facing in a second circumferential direction;
in the event of an imminent braking or a reversal of the rotational motion of the drive motor, the method comprising:
a) establishing a currently present rotational direction of the first disk and determining the side surface on which the pin is supported during the rotation of the first disk; and
at least one of
b) determining a preloading force of the at least one spring according to a position of the second disk in the axial direction; and
c) determining a first play between the pin and the first side surface as well as the second side surface; and
then
d) reducing dynamics of the electric drive motor by the control device at least in dependence on at least the determined preloading force or the first play in such a way that, during braking, the pin contacts only the side surface established in step a) or that in the event of a reversal of the rotational motion, the pin bridges the first play at a reduced first rotational speed of the drive motor and comes into contact with the other side surface and only then does an increase to a second rotational speed occur.

2. The method of claim 1, wherein in step c) a second play of at least one speed-transforming gear between the drive motor and the first disk is additionally taken into account.

3. The method of claim 1, wherein the method is carried out when the actuator is moved into a mechanical end stop.

4. The method of claim 1, wherein the method is carried out when the actuator is moved out of a mechanical end stop into a position which corresponds to a torque requirement of the clutch.

5. The method of claim 1, wherein the method is carried out when the clutch is closed, wherein during step d) the first rotational speed is constant.

6. The method of claim 1, wherein the method is carried out when the clutch is opened.

7. The method of claim 6, wherein the clutch is opened at a third rotational speed of the drive motor, wherein directly before reaching a kiss point of the clutch the drive motor has a fourth rotational speed which is reduced relative to the third rotational speed.

8. The method of claim 7, wherein during the braking of the electric drive motor the third rotational speed of the first disk decreases exponentially.

9. A system, comprising:
a drive motor;
a clutch;
an actuator for the clutch, the actuator including an electric drive motor and a control device;
a ramp mechanism which includes a rotatable first disk, which has first ramps, a second disk which can be moved only in an axial direction and which has second ramps, and balls which are arranged between the disks in the first ramps and second ramps; and
at least one spring for moving the second disk in the axial direction;
wherein the control device includes a processor and a memory, the memory storing instructions executable by the processor to:

a) establish a currently present rotational direction of the first disk and determine the side surface on which the pin is supported during the rotation of the first disk; and at least one of
b) determine a preloading force of the at least one spring according to a position of the second disk in the axial direction; and
c) determine a first play between the pin and the first side surface as well as the second side surface; and then
d) reduce dynamics of the electric drive motor by the control device at least in dependence on at least the determined preloading force or the first play in such a way that, during braking, the pin contacts only the side surface established in step a) or that in the event of a reversal of the rotational motion, the pin bridges the first play at a reduced first rotational speed of the drive motor and comes into contact with the other side surface and only then does an increase to a second rotational speed occur.

10. The system of claim 9, wherein in step c) a second play of at least one speed-transforming gear between the drive motor and the first disk is additionally taken into account.

11. The system of claim 9, wherein the instructions further include instructions to execute at least one of steps a) to d) when the actuator is moved into a mechanical end stop.

12. The system of claim 9, wherein the instructions further include instructions to execute at least one of steps a) to d) when the actuator is moved out of a mechanical end stop into a position which corresponds to a torque requirement of the clutch.

13. The system of claim 9, wherein the instructions further include instructions to execute at least one of steps a) to d) when the clutch is closed, wherein during step d) the first rotational speed is constant.

14. The system of claim 13, wherein the first rotational speed is constant in a transmission region of the clutch in which between 5 and 15 newton meters are able to be transmitted.

15. The system of claim 9, wherein the instructions further include instructions to omit at least one of steps a) to d) according to an amount of torque which is required in the event of a torque requirement.

16. The system of claim 15, wherein the amount of the requested torque is at least 50 newton meters.

17. The system of claim 9, wherein instructions further include instructions to execute at least one of steps a) to d) when the clutch is opened.

18. The system of claim 17, wherein the clutch is opened at a third rotational speed of the drive motor, wherein directly before reaching a kiss point of the clutch the drive motor has a fourth rotational speed which is reduced relative to the third rotational speed.

19. The system of claim 18, wherein during the braking of the electric drive motor the third rotational speed of the first disk decreases exponentially.

20. The system of claim 19, wherein the exponential decrease in the third rotational speed takes place in a transmission region of the clutch in which between 5 and 15 newton meters are able to be transmitted.

* * * * *